(12) United States Patent
Mulhern et al.

(10) Patent No.: US 9,310,837 B2
(45) Date of Patent: Apr. 12, 2016

(54) ROTATING MECHANISM FOR COMPUTER OR SIMILAR DEVICE

(75) Inventors: Iordanka Koleva Mulhern, Milwaukee, WI (US); Saharut Sirichai, Bangkok (TH)

(73) Assignee: WORLD RICHMAN MANUFACTURING CORPORATION, Elgin, IL (US)

( * ) Notice: Subject to any disclaimer, the term of this patent is extended or adjusted under 35 U.S.C. 154(b) by 0 days.

(21) Appl. No.: 14/388,063

(22) PCT Filed: May 1, 2012

(86) PCT No.: PCT/US2012/000229
§ 371 (c)(1),
(2), (4) Date: Sep. 25, 2014

(87) PCT Pub. No.: WO2013/158058
PCT Pub. Date: Oct. 24, 2013

(65) Prior Publication Data
US 2015/0122851 A1      May 7, 2015

(30) Foreign Application Priority Data

Apr. 16, 2012   (WO) ............... PCT/US2012/000204

(51) Int. Cl.
| A47B 96/06 | (2006.01) |
| A47F 5/00 | (2006.01) |
| A47F 1/10 | (2006.01) |
| G06F 1/16 | (2006.01) |

(52) U.S. Cl.
CPC ...... *G06F 1/1626* (2013.01); *G06F 2200/1614* (2013.01); *G06F 2200/1633* (2013.01); *Y10T 29/49895* (2015.01)

(58) Field of Classification Search
CPC . F16M 13/022; F16M 11/041; F16M 11/046; F16M 11/22; G06F 1/1626; G06F 22/1614; G06F 22/1633; Y10T 29/49895
See application file for complete search history.

(56) References Cited

U.S. PATENT DOCUMENTS

| 6,089,520 | A * | 7/2000 | Wu ...................... F16M 11/12 248/371 |
| 8,230,992 | B2 * | 7/2012 | Law ...................... G06F 1/1626 206/320 |
| 8,234,754 | B2 * | 8/2012 | Yamaguchi ............. E05D 15/48 16/239 |
| 8,746,449 | B2 * | 6/2014 | Gallagher ............ F16M 11/105 206/320 |
| 9,080,716 | B2 * | 7/2015 | Mulhern .............. F16M 13/022 |

* cited by examiner

*Primary Examiner* — Amy Sterling
(74) *Attorney, Agent, or Firm* — Christopher J. Scott

(57) ABSTRACT

A rotating mechanism for a computer or similar device cooperates with a case to hold the computer or similar device in a desired position. The rotating mechanism has a cradle to receive the computer or similar device and a mounting disk to attach to the case. The cradle has an aperture to cooperate with the mounting disk to secure the computer or similar device to the case.

14 Claims, 12 Drawing Sheets

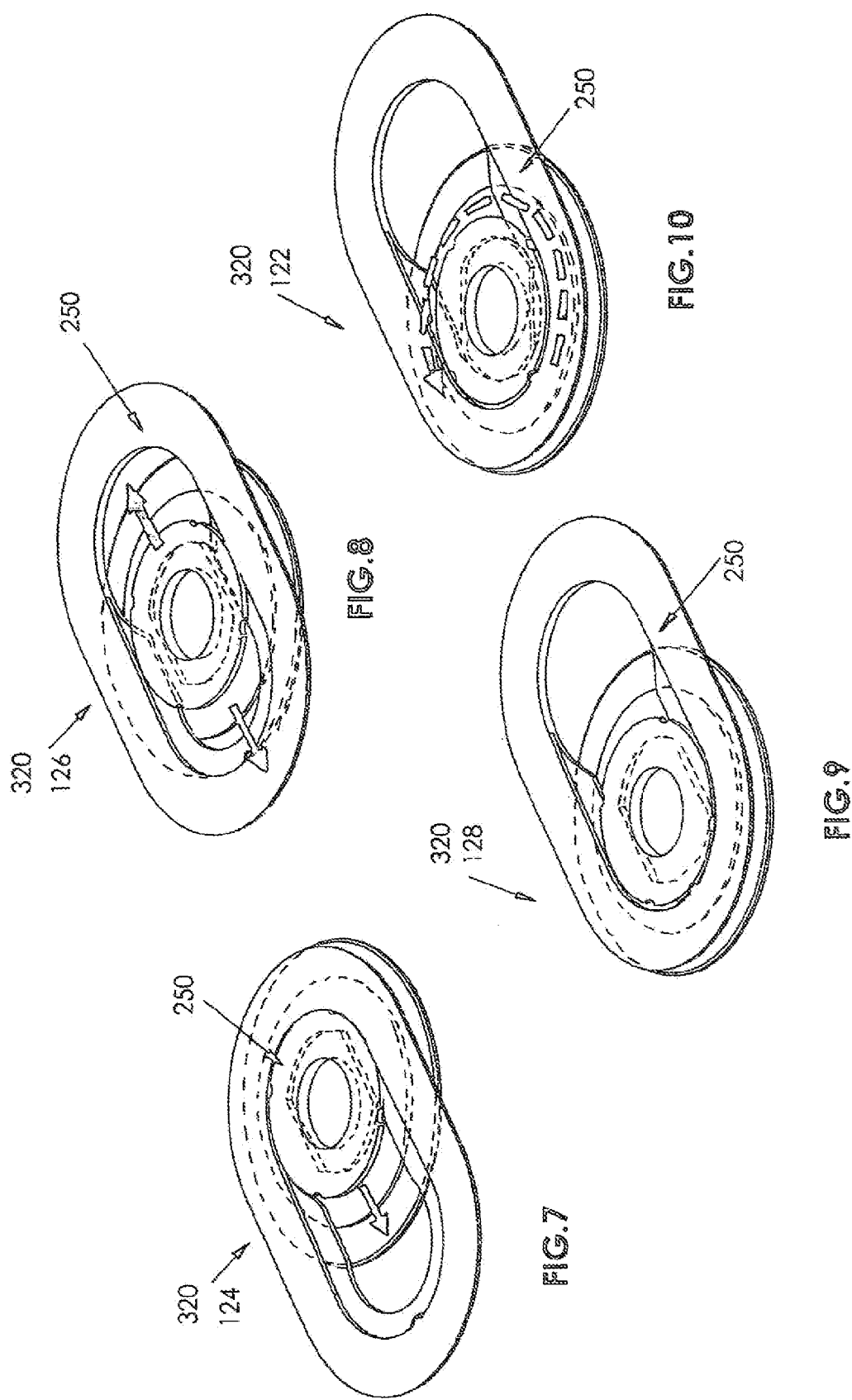

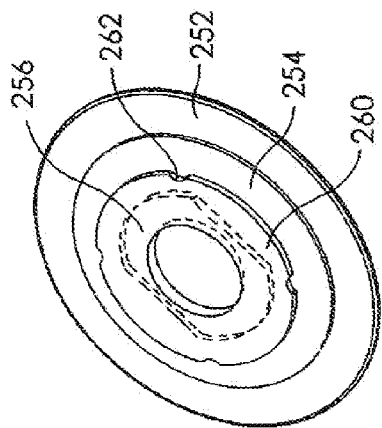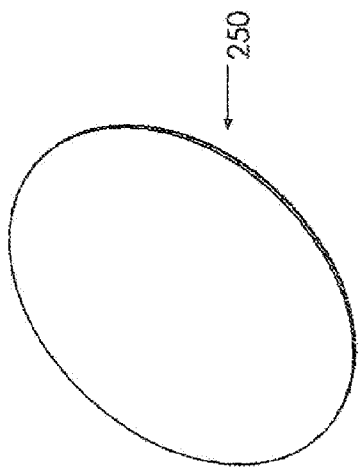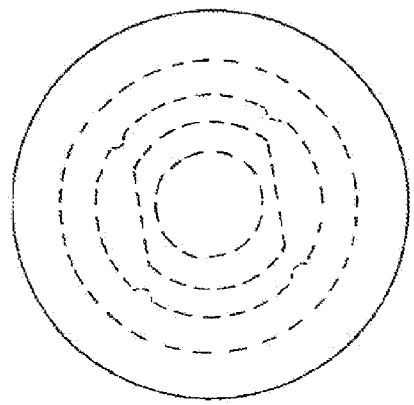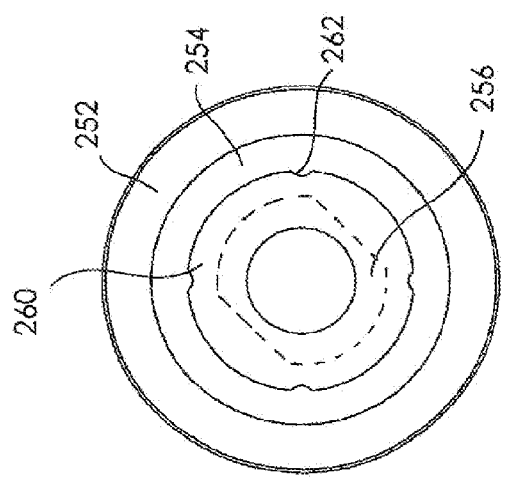

ROTATING MECHANISM FOR COMPUTER OR SIMILAR DEVICE

PRIOR HISTORY

This application claims the benefit of pending International Patent Application Nos. (a) PCT/US2012/000204 filed in the United States Patent and Trademark Office as International Receiving Office on 16 Apr. 2012 and (b) PCT/US2012/000229 filed in the United States Patent and Trademark Office as International Receiving Office on 1 May 2012, which application bears a claimed priory date of 16 Apr. 2012.

BACKGROUND OF THE INVENTION

1. Field of the Invention

This invention generally relates to a rotating mechanism for a computer or similar device, and more particularly, to a rotating mechanism for a computer or similar device, which attaches to a case for the computer or similar device.

2. Brief Description of the Prior Art

As a computer or a similar device is used, it is very desirable to facilitate that use. It is especially useful if a device supporting the computer does so with minimal intrusiveness. It is especially desirable to be able to rotate the computer for different views, while supporting the computer in a desired position. When the computer or similar device is supported on its carrying case during use thereof, the multi-function use of the case provides great advantages for utility thereof, while keeping a structure for the improved use to a minimum.

A computer or a similar device can come in a variety of sizes. It is very useful for a computer mounting device to adjust to the size of the respective device, while still providing the desired holding and rotating capabilities. Such a requirement can work against the other requirements. To a certain extent, various requirements for utility, functionality and simplicity work against each other. Emphasizing one over the other can compromise the overall function. Thus, it is best to avoid such compromises.

SUMMARY OF THE INVENTION

Among the many objectives of this invention is the provision of a rotating mechanism for a computer or similar device, which cooperates with a carrying case for the computer or similar device. A further objective of this invention is the provision of a rotating mechanism for a computer or similar device, which facilitates rotation of the computer or similar device. Yet a further objective of this invention is the provision of a rotating mechanism for a computer or similar device, which facilitates mounting of the computer or similar device on the case.

A still further objective of this invention is the provision of a rotating mechanism for a computer or similar device, which facilitates positioning of the computer or similar device. Another objective of this invention is the provision of a rotating mechanism for a computer or similar device, which is strong. Yet another objective of this invention is the provision of a rotating mechanism for a computer or similar device, which is durable. Still another objective of this invention is the provision of a rotating mechanism for a computer or similar device, which adjusts to the size of the computer or similar device.

These and other objectives of the invention (which other objectives become clear by consideration of the specification, claims and drawings as a whole) are met by providing a rotating mechanism for a computer or similar device which cooperates with a case for the computer or similar device and allows the computer or similar device to be placed in a variety of positions relative to the case.

BRIEF DESCRIPTION OF THE DRAWINGS

FIG. 7 depicts the insertion stage 124 of mounting disk 250 in keyhole aperture 130.

FIG. 8 depicts the middle stage 126 of mounting disk 250 in keyhole aperture 130.

FIG. 9 depicts the positioning stage 128 of mounting disk 250 in keyhole aperture 130.

FIG. 10 depicts the locked or final stage 122 of mounting disk 250 in keyhole aperture 130.

FIG. 16 depicts a top plan view of mounting disk 250 of rotating mechanism 100.

FIG. 17 depicts a side view of mounting disk 250 of rotating mechanism 100.

FIG. 18 depicts a bottom plan view of mounting disk 250 of rotating mechanism 100.

FIG. 19 depicts a top perspective view of mounting disk 250 of rotating mechanism 100.

FIG. 20 depicts a bottom perspective view of mounting disk 250 of rotating mechanism 100.

Throughout the figures of the drawings, where the same part appears in more than one figure of the drawings, the same number is applied thereto.

DESCRIPTION OF THE PREFERRED EMBODIMENTS

Figure 1:
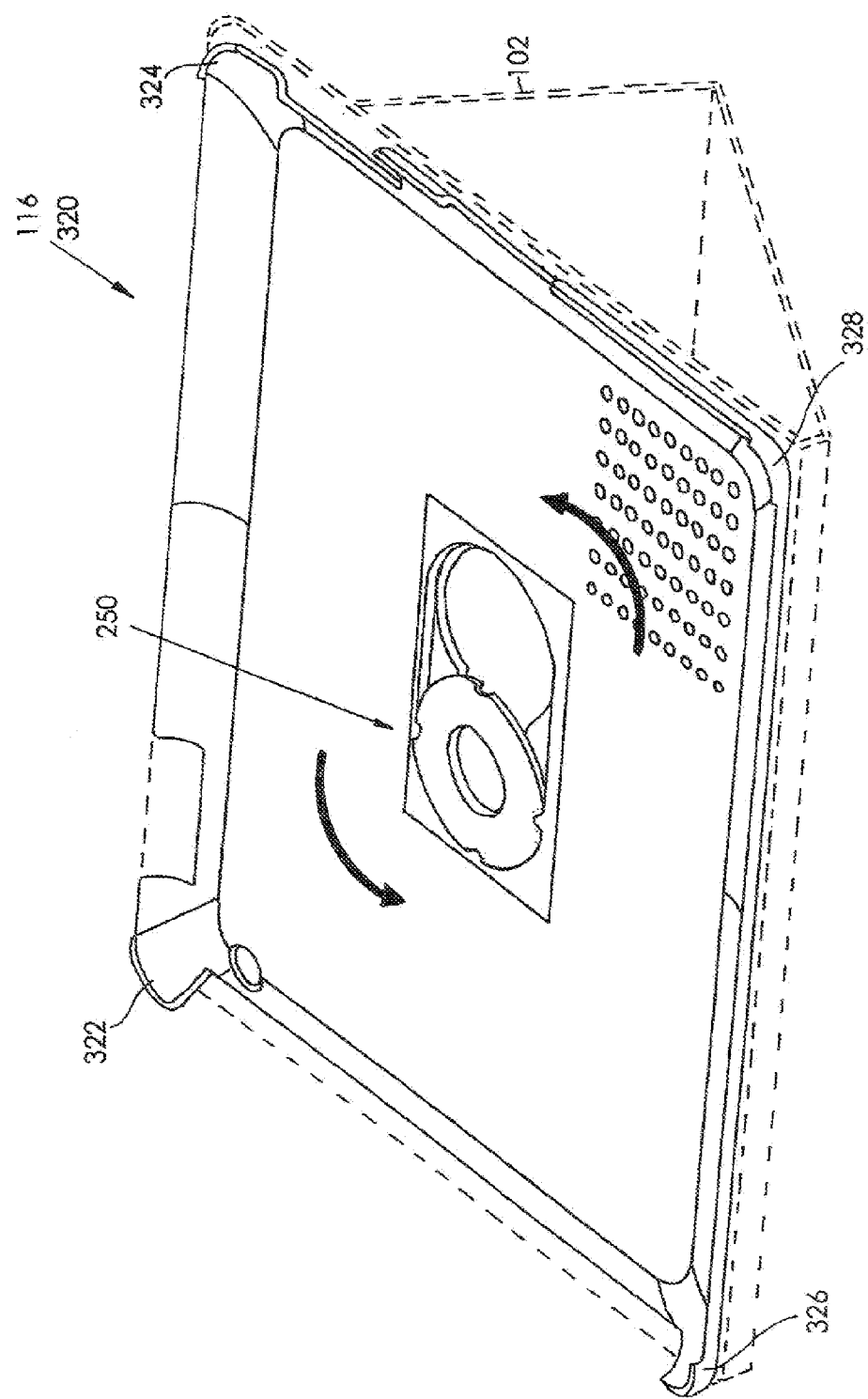
FIG. 1 depicts a front perspective view of plate computer cradle 320 of rotating mechanism 100 mounted on case 102 in landscape position 116 with case 102 depicted in phantom.
Figure 2:
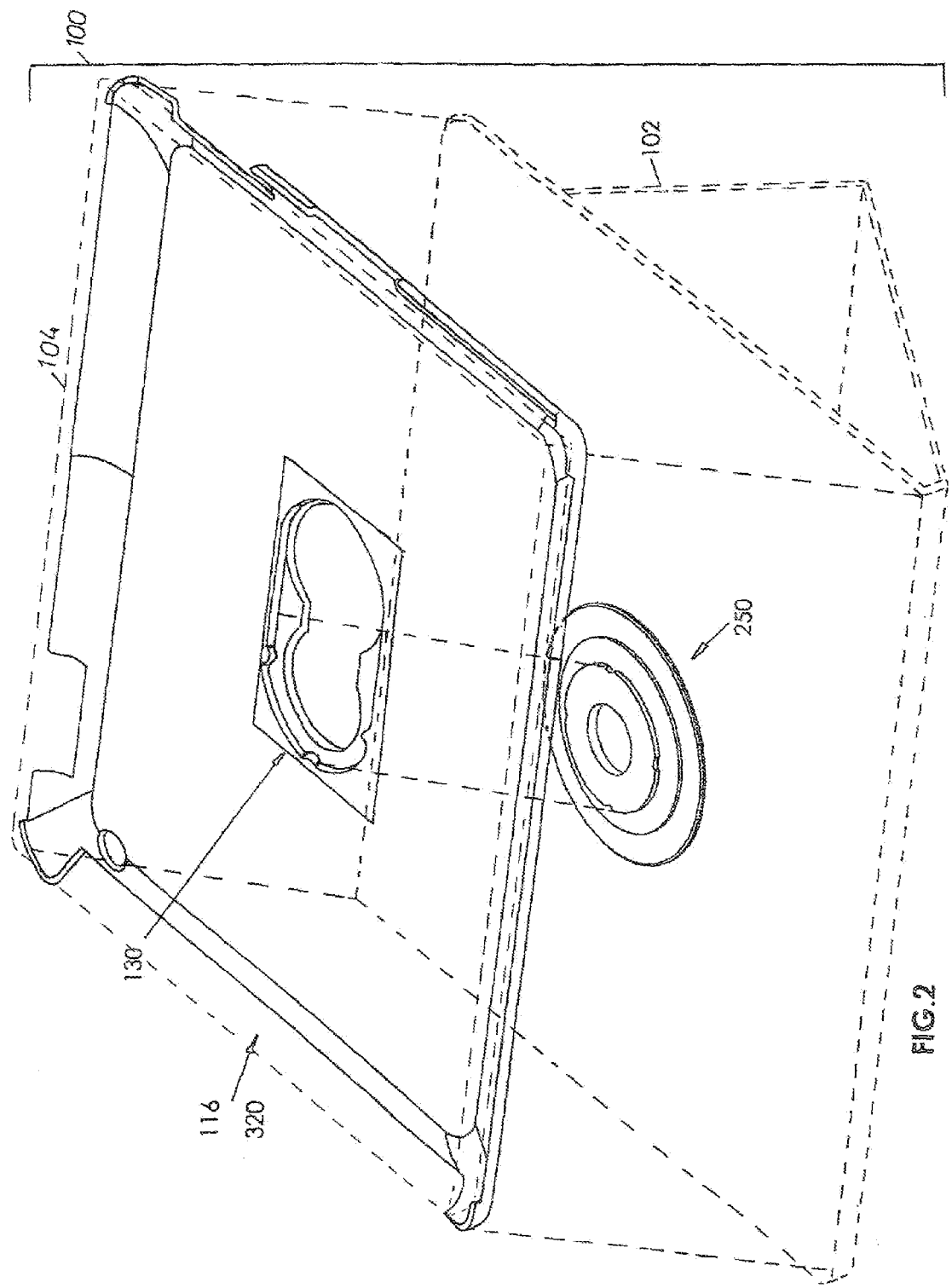
FIG. 2 depicts an exploded perspective view of plate computer cradle 320 of rotating mechanism 100 being attached to mounting disk 250 on case 102 with case 102 and computer 104 depicted in phantom.
Figure 3:
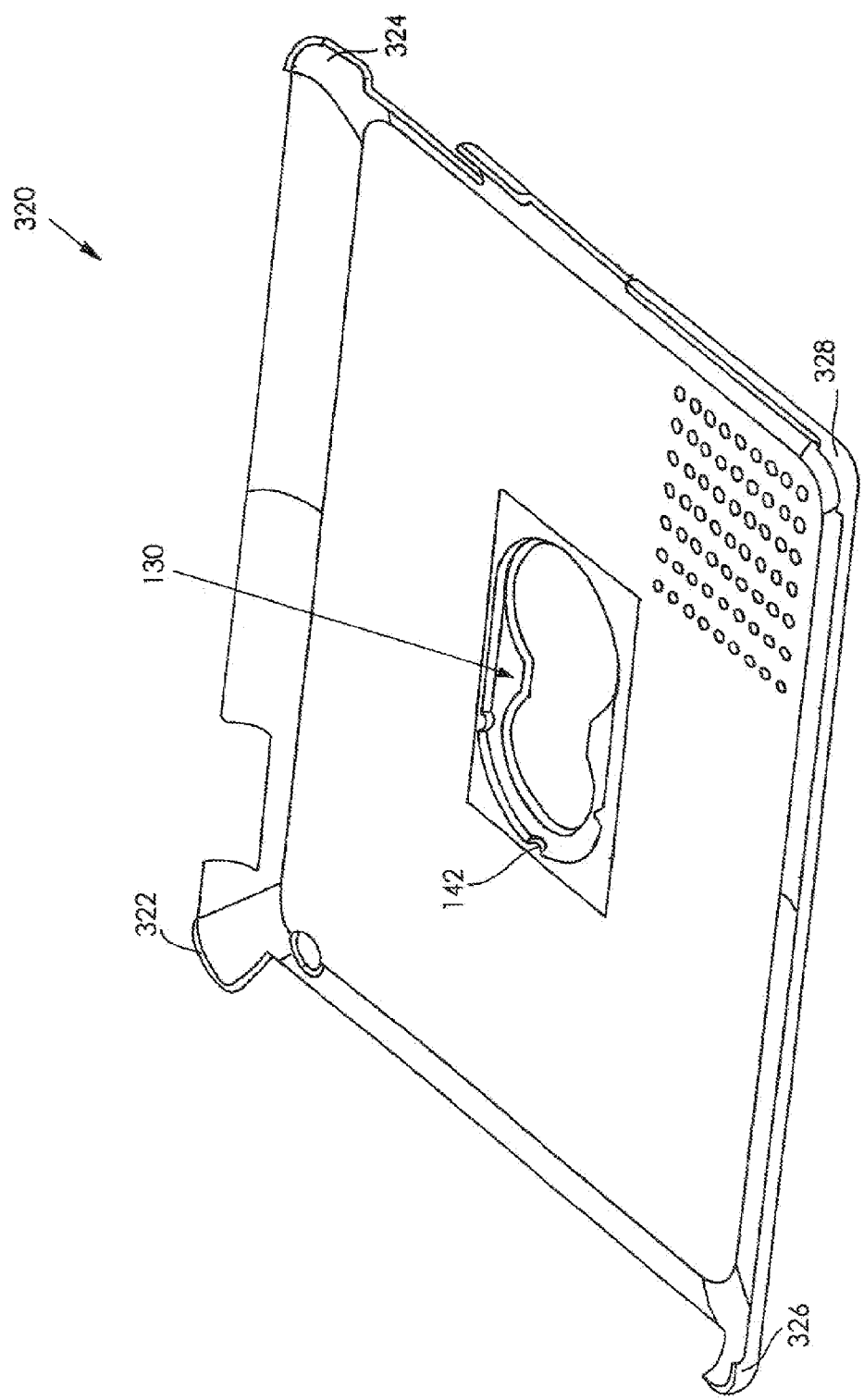
FIG. 3 depicts a top perspective view of plate computer cradle 320 of rotating mechanism 100.
Figure 4:
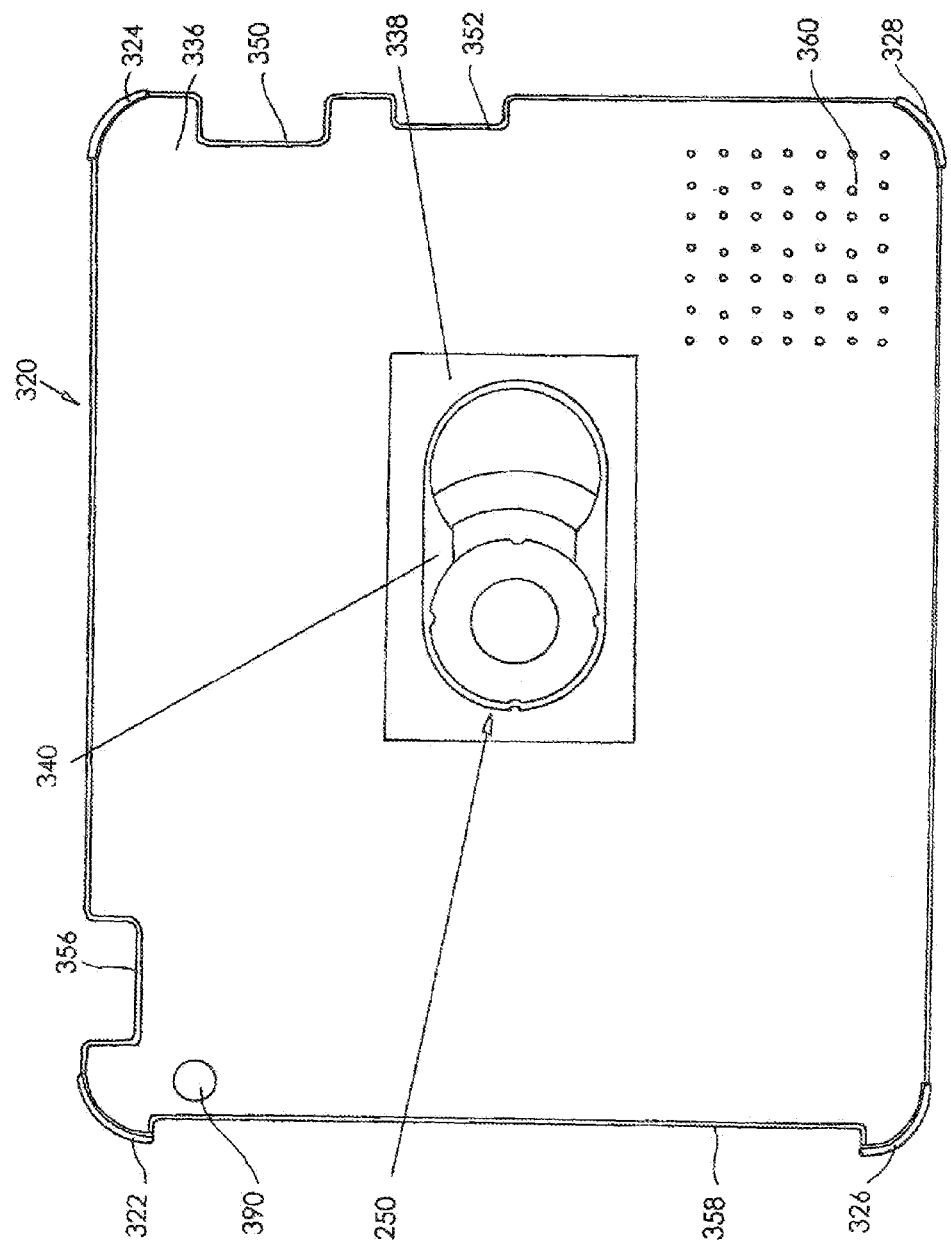
FIG. 4 depicts a top plan view of plate computer cradle 320 of rotating mechanism 100.
Figure 5:
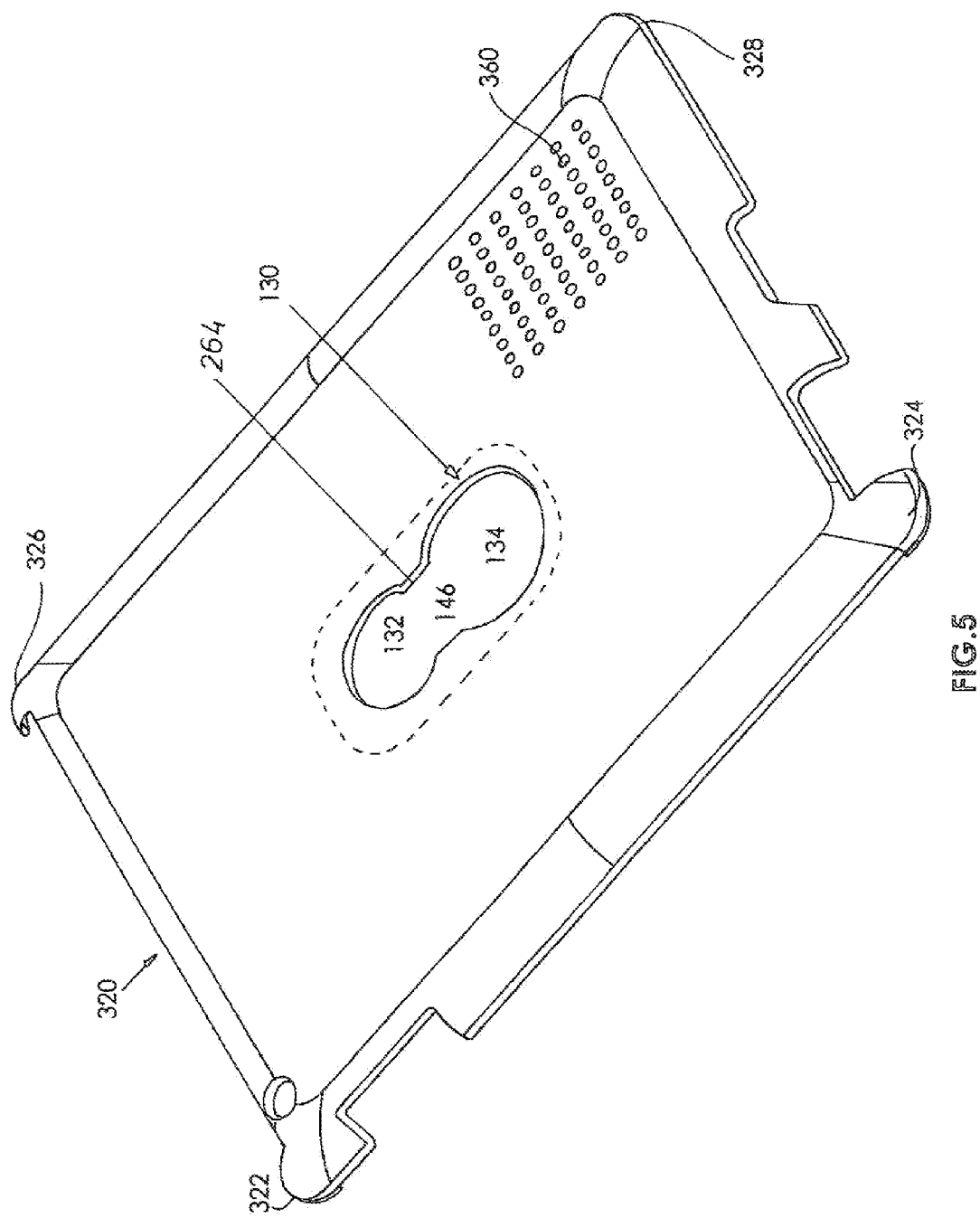
FIG. 5 depicts a bottom perspective view of plate computer cradle 320 of rotating mechanism 100.
Figure 6:
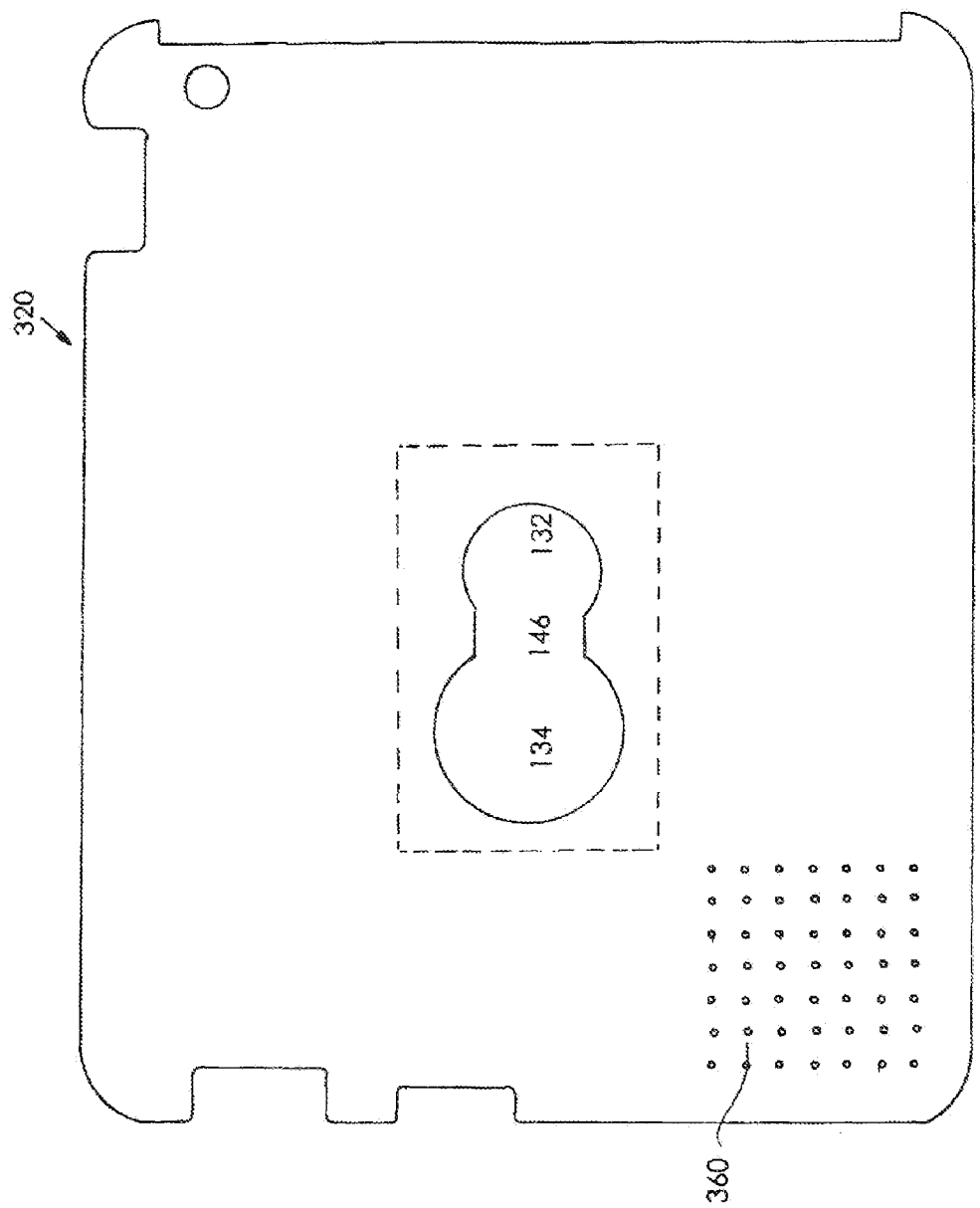
FIG. 6 depicts a bottom plan view of plate computer cradle 320 of rotating mechanism 100.
Figure 11:
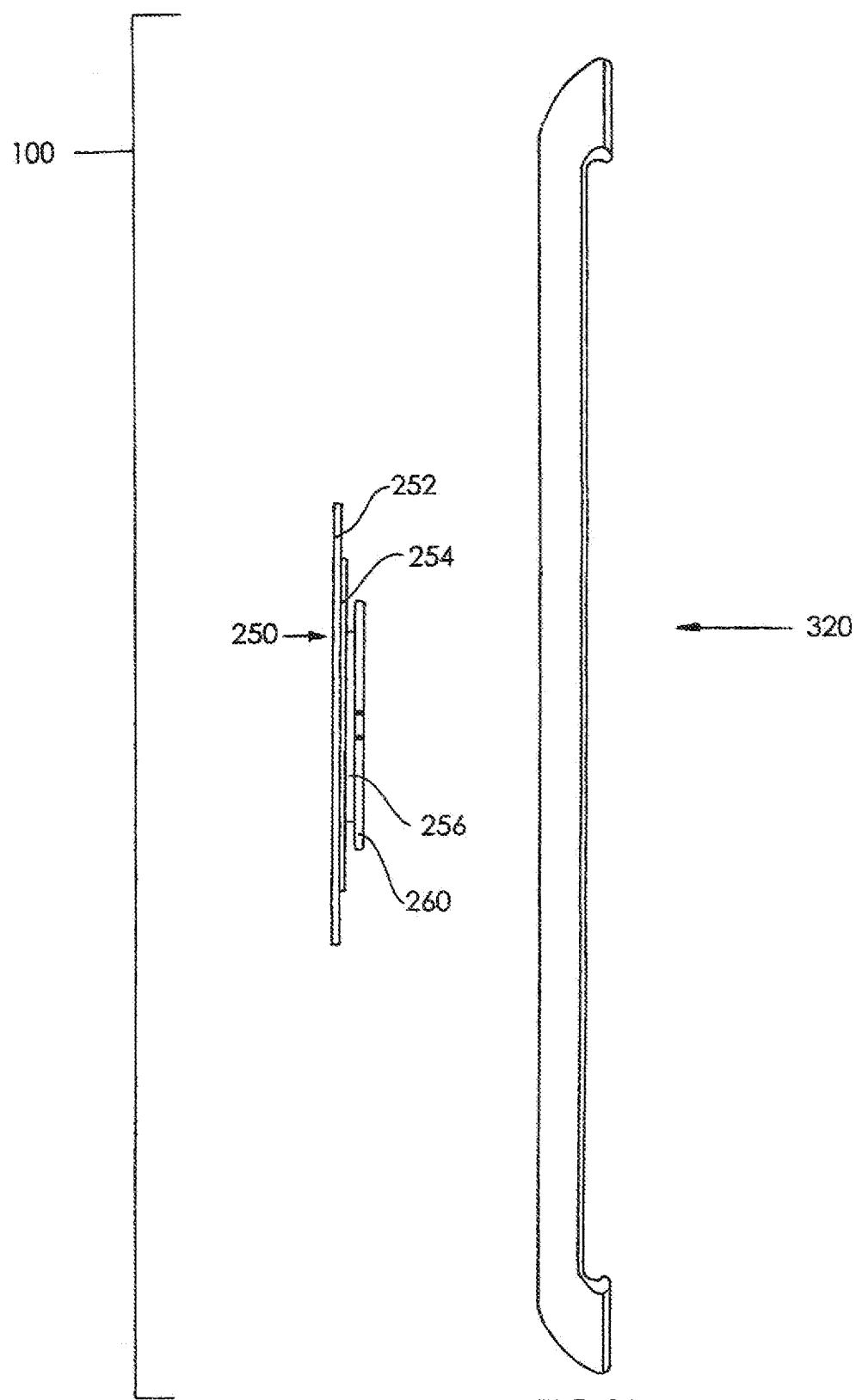
FIG. 11 depicts a side view of plate computer cradle 320 and mounting disk 250 of rotating mechanism 100.
Figure 12:
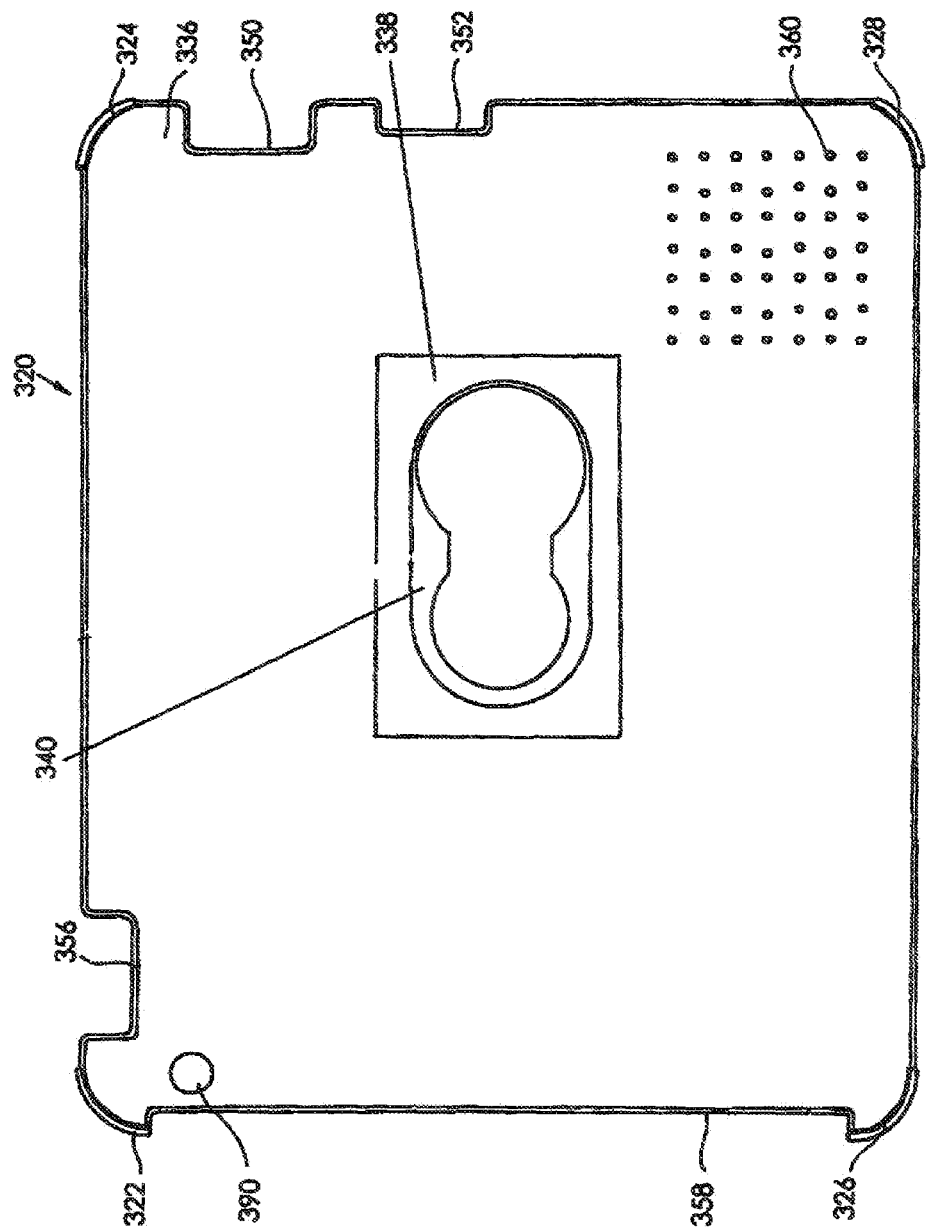
FIG. 12 depicts a top plan view of plate computer cradle 320 of rotating mechanism 100 with keyhole aperture 130.

Reference will now be made in detail to several embodiments of the invention that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, over, above, below, beneath, rear, and front, may be used with respect to the drawings. These and similar to directional terms are not to be construed to limit the scope of the invention in any manner. The words attach, connect, couple, and similar terms with their inflectional morphemes do not necessarily denote direct or intermediate connections, but may also include connections through mediate elements or devices.

In accordance with the present invention, a rotating mechanism for a computer or similar device cooperates with a carrying case. While in the rotating mechanism, the computer or similar device may be rotated to achieve a different view of the screen, for example a portrait or landscape position. The computer or similar device may be removed from the carrying case when desired.

Some examples of the computer or similar device include any from the series of IPAD®. IPAD® is a United States Registered Trademark of Apple Inc., a Corporation incorporated under the laws of the State of California, 1 Infinite Loop, Cupertino, Calif., 95014. The computer or similar device may be a MOTOROLA XOOM®. MOTOROLA XOOM® is a United States Registered Trademark of Motorola Trademark Holdings, a Limited Liability Company incorporated under the laws of the State of Delaware, 600 N. U.S. Highway 45, Libertyville, Ill., 60048. The computer or similar device may be a KINDLE®. KINDLE® is a United States Registered Trademark of Amazon Technologies, Inc., a Corporation organized under the laws of the State of Nevada, P.O. Box 8102, Reno, Nev., 89507. The computer or similar device may be a NOOK®. NOOK® is a United States Registered Trademark of Fission LLC, a Limited Liability Company organized under the laws of the State of Delaware, 122 Fifth Avenue, N.Y., N.Y., 10011. The computer or similar device may be any hand-held computing device, media reader, tablet computer, or portable electronic device for receiving and reading text, images, or other audio visual media.

Referring now to FIG. 1, FIG. 2, FIG. 3, FIG. 4, FIG. 5, FIG. 6, FIG. 7, FIG. 8, FIG. 9, FIG. 10, FIG. 11, and FIG. 12, a rotating mechanism 100 cooperates with a case 102 with a computer 104 mounted thereon. The computer 104 may be rotated and secured in a desired position such as landscape position 116 (FIG. 1 and FIG. 2), inverted landscape position (not shown), portrait position (not shown), or inverted portrait position (not shown). Rotating mechanism 100 has a plate computer cradle 320 with a cooperating mounting disk 250. Mounting disk 250 is secured to case 102 in a suitable fashion such as sewing, adhesives, a hook and loop assembly, or any other suitable attachment mechanism or product. Plate computer cradle 320 receives computer 104 and cooperates with mounting disk 250 to secure computer 104 in a desired position.

Plate computer cradle 320 has first cupped prop 322, second cupped prop 324, third cupped prop 326, and fourth cupped prop 328. Each cupped prop 322, 324, 326, and 328 accepts a corner of the computer 104 in a locking fashion consistent with the flexibility of the material used for plate computer cradle 320. Cupped props 322, 324, 326, and 328 secure computer 104 to plate computer cradle 320. Cupped props 322, 324, 326 and 328 are the preferred embodiment. However, any suitable fastening means is acceptable and encompassed by this disclosure, including but not limited to, belts, elastic bands, or hook and loop assembly.

Plate computer cradle 320 includes keyhole aperture 130 (FIG. 5) having a lock loop 132, which is the locking side, and mounting loop 134, which is the receiving side. Locking axle 256 moves from insertion stage 124 (FIG. 7) to middle stage 126 (FIG. 8) to positioning stage 128 (FIG. 9) to locked or final stage 122 (FIG. 10) for mounting. The moves are reversed for removing plate computer cradle 320 from case 102.

The keyhole aperture 130 is recessed within the cradle surface 336, preferably with a series of three surfaces. The cradle surface 336 receives the back of computer 104. Cradle surface 336 surrounds a first recession 338. First recession 338 surrounds a second recession 340 which is preferably flush with keyhole aperture 130. The recessed keyhole aperture 130 allows mounting disk 250 to be inserted within the aperture 130 and slide, traveling from insertion stage 124 to the locked or final stage 122 without contacting computer 104. Thus, once mounted, locking disk 260 is even with or slightly beneath the cradle surface 336. Thus, computer 104 lays flat against plate computer cradle 320.

First recession 338 has locking tab 142. Locking disk 260 has a series of notches 262. To place the computer 104 in a desired position during locked or final stage 122, plate computer cradle 320 is rotated around mounting disk 250 and the locking tab 142 is aligned with the corresponding notch 262. When the desired position is achieved, locking tab 142 cooperates with notch 262 to firmly lock the plate computer cradle 320 in place on the rotational axis.

Plate computer cradle 320 has a series of user access notches 350, 352, 356, and 358 which allow the user to access various features and functions without the need to remove computer 104 from plate computer cradle 320. Speaker output notch 350 provides unobstructed sound output. Charger and docking notch 352 provides the user access to charger functions and input/output operations. Audio notch 356 provides the user with access to the volume control and mute switch. Power standby notch 358 provides the user with access to the switch to put computer 104 in standby mode.

Plate computer cradle 320 has camera aperture 390 to allow the user unobstructed access to the camera function without removing computer 104 from plate computer cradle 320. Plate computer cradle 320 also has heat sink ventilation apertures 360 to allow heat generated from computer 104 to dissipate into the external environment.

Figure 13:
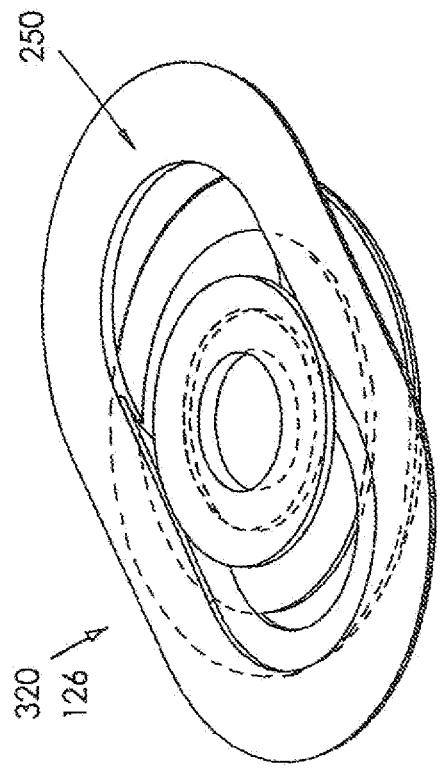
FIG. 13 depicts the insertion stage 124 of mounting disk 250 in teardrop aperture 130.
Figure 14:
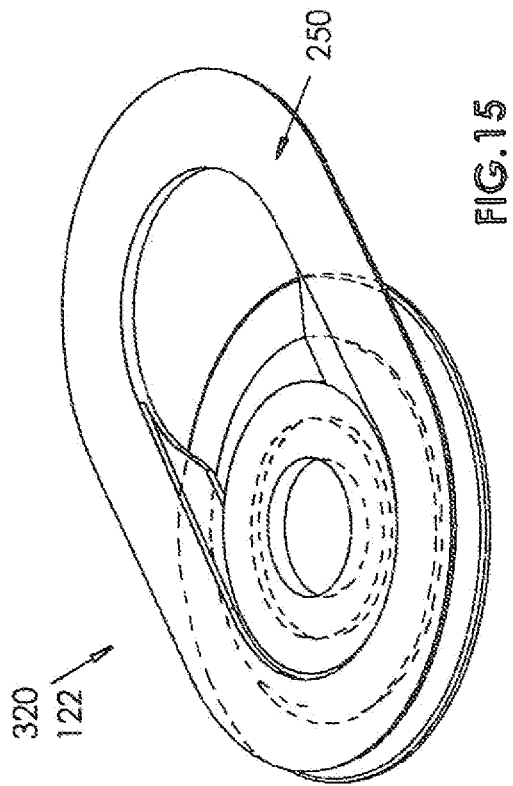
FIG. 14 depicts the middle stage 126 of mounting disk 250 in teardrop aperture 130.
Figure 15:
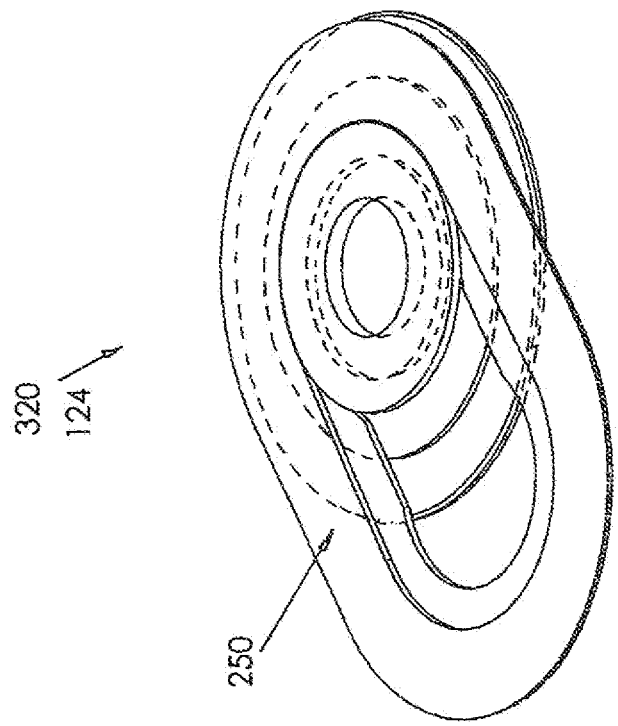
FIG. 15 depicts the locked or final stage 122 of mounting disk 250 in teardrop aperture 130.

In FIG. 13, FIG. 14, and FIG. 15, plate computer cradle 320 has teardrop aperture 130 instead of keyhole aperture 130. Keyhole aperture 130 and teardrop aperture 130 are interchangeable and either aperture 130 can be used in any embodiment. Teardrop aperture 130 has receiving side 134 and locking side 132 separated by channel 146. Channel 146 has a pair of tapering straight edges 264. Locking axle 256 can be generally round in shape when used with teardrop aperture 130. Locking axle 256 inserts into receiving side 134 for insertion stage 124 (FIG. 13). Locking axle 256 is moved into middle stage 126 (FIG. 14) and then into locking side 132 for locked or final stage 122 (FIG. 15). The moves are reversed for dismounting plate computer cradle 320 from mounting disk 250.

Considering now FIG. 16, FIG. 17, FIG. 18, FIG. 19, and FIG. 20, mounting disk 250 has a base attachment surface 252, usually circular in appearance. Base attachment surface 252 is attached to case 102. A smaller disk 254 is next. Smaller disk 254 is flush with the surface of case 102. Locking axle 256 is next. Locking disk 260 is the top piece and is substantially bigger than locking axle 256.

Locking axle 256 fits into mounting loop 134 or receiving side 134 for insertion stage 124, and secures mounting disk 250 in lock loop 132 or locking side 132 for locked or final stage 122. Keyhole aperture 130 has a pair of parallel straight edges 264 connecting mounting loop 134 to lock loop 132. The straight edges 246 form channel 146. The straight edges 264 of channel 146 are aligned with the straight edges of locking axle 256 during insertion stage 124 and remain aligned through middle stage 126 and into positioning stage 128. Plate computer cradle 320 is then rotated so that the straight edges 264 of locking axle 256 are not aligned with straight edges 264 of channel 146 during locked or final stage 122. The non-aligned position secures mounting disk 250 in the keyhole aperture 130.

Figure 21:
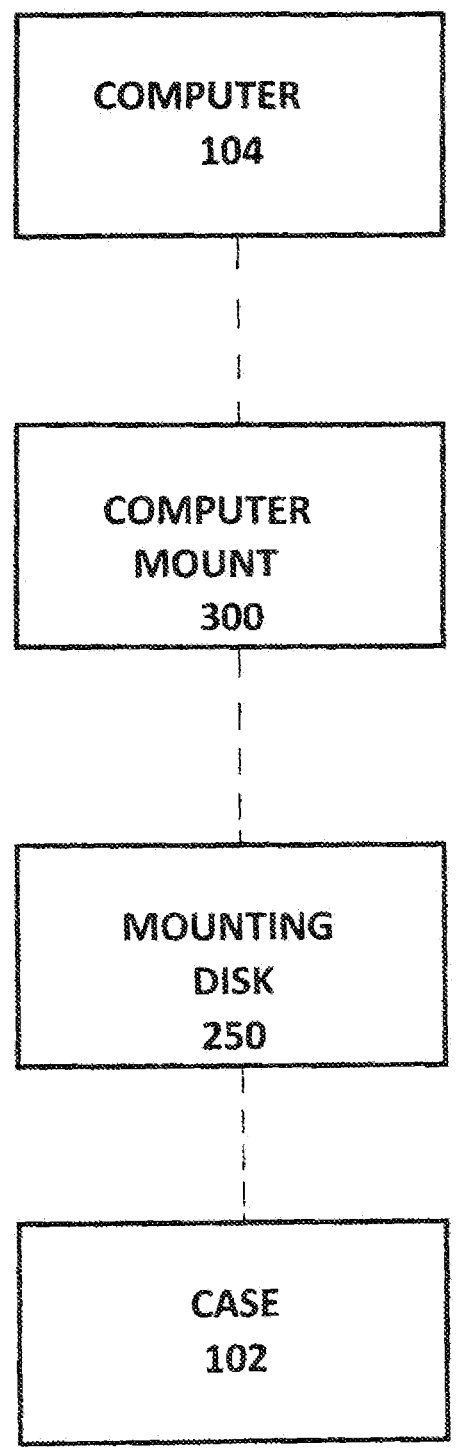
FIG. 21 depicts a block diagram of rotating mechanism 100.

Teardrop aperture 130 does not require the alignment of tapering straight edges 264. FIG. 21 depicts a computer mount 300, which can include plate computer cradle 320, among other versions. Computer mount 300 attaches to mounting disk 250 on case 102. Computer mount 300 receives computer 104 and rotates around mounting disk 250 to achieve the desired position.

This application—taken as a whole with the abstract, specification, claims, and drawings being combined—provides sufficient information for a person having ordinary skill in the art to practice the invention as disclosed and claimed herein. Any measures necessary to practice this invention are well within the skill of a person having ordinary skill in this art after that person has made a careful study of this disclosure. Because of this disclosure and solely because of this disclosure, modification of this method and device can become clear to a person having ordinary skill in this particular art. Such modifications are clearly covered by this disclosure.

We claim:

1. A device for attaching a computer to a surface in a desired position, the device comprising:
    a. a cradle to receive the computer; and
    b. a mounting disk attached to the surface;
    c. the surface being a case for the computer;
    d. the mounting disk cooperating with the cradle to connect the computer to the case in the desired position;
    e. the mounting disk having a locking axle, a locking disk, a base attachment surface, and a smaller disk, the locking disk being attached to a top side of the locking axle, the smaller disk being attached to a bottom side of the locking axle, the base attachment surface being attached to a bottom side of the smaller disk;
    f. the cradle being removable from the case;
    g. the cradle having an aperture to cooperate with the mounting disk, the aperture being recessed from a cradle surface of the cradle and having a receiving side and a locking side, the receiving side accepting the locking axle, the locking side accepting the locking axle from the receiving side;
    h. the locking side and the locking axle cooperating to secure the computer in the desired position, the locking disk being larger than the locking axle to secure the mounting disk in the aperture, the cradle surface being at an elevation higher than the aperture to support the computer above the mounting disk, the base attachment surface attaching the mounting disk to the case, the smaller disk being flush with a surface of the case.

2. The device of claim 1 wherein:
    a. the cradle has at least one cupped prop to receive the computer; and
    b. the aperture is a closed loop to further secure the cradle to the case.

3. The device of claim 1 wherein:
    a. the aperture has a channel separating the receiving side from the locking side;
    b. the channel has two straight edges oppositely disposed from each other;
    c. the locking axle has two straight edges oppositely disposed from each other;
    d. the two straight edges of the locking axle align with the two straight edges of the channel to allow the locking axle to slide through the channel from the receiving side to the locking side;
    e. the cradle is rotatable to a non-aligning position between the two straight edges of the locking axle and the two straight edges of the channel; and
    f. the two straight edges of the locking axle prevent the locking axle from entering the channel from the locking side once the non-aligning position is achieved.

4. The device of claim 3 wherein:
    a. the cradle has a first recession and a second recession encircling the aperture;
    b. the first recession has a locking tab adjacent to the locking side of the aperture;
    c. the locking disk has at least one notch; and
    d. the locking tab aligns with at least one notch to secure the computer in the desired position.

5. The device of claim 4 wherein:
    a. the cradle is a plate computer cradle;
    b. the plate computer cradle has a speaker output notch;
    c. the plate computer cradle has a charger and docking notch;
    d. the plate computer cradle has an audio notch;
    e. the plate computer cradle has a power standby notch;
    f. the plate computer cradle has a series of heat sink ventilation apertures;
    g. the plate computer cradle has a camera aperture;
    h. the aperture that cooperates with the mounting disk is a keyhole aperture with a locking loop and a mounting loop;
    i. the locking loop has a locking loop diameter, the locking loop diameter being smaller than a mounting loop diameter of the mounting loop to facilitate securing of the cradle in the desired position; and
    j. the cradle secured in the locking loop is able to rotate 360 degrees about the mounting disk.

6. The device of claim 2 wherein:
    a. the cradle is a plate computer cradle;
    b. the at least one cupped prop is four cupped props;
    c. each of the four cupped props receive a corner of the computer;
    d. the four cupped props secure the computer to the plate computer cradle;
    e. the plate computer cradle has a speaker output notch;
    f. the plate computer cradle has a charger and docking notch;
    g. the plate computer cradle has an audio notch;
    h. the plate computer cradle has a power standby notch;
    i. the plate computer cradle has a series of heat sink ventilation apertures;
    j. the plate computer cradle has a camera aperture;
    k. the aperture that cooperates with the mounting disk is a teardrop aperture with a locking side and a receiving side; and
    l. the cradle secured in the locking side is able to rotate 360 degrees about the mounting disk.

7. A support assembly for attaching an electronic device to a surface, the support assembly comprising:
    a. a cradle for receiving the electronic device; and
    b. a cradle-securing mounting disk assembly attachable to a select surface;
    c. the cradle-securing mounting disk assembly being cooperable with the cradle to removably attach the electronic device to the select surface in a select rotative position;
    d. the cradle-securing mounting disk assembly comprising a locking axle, a locking disk, a base attachment surface, and a smaller disk, the locking disk being attached to a top side of the locking axle, the smaller disk being attached to a bottom side of the locking axle, the base attachment surface being attached to a bottom side of the smaller disk;

e. the cradle comprising an aperture, the aperture being formed in a recessed portion of a front surface of the cradle and comprising a receiving side and a locking side, the receiving side accepting the locking axle, the locking side accepting the locking axle from the receiving side;

f. the aperture and the mounting disk assembly being cooperable for securely attaching the electronic device to the select surface in the select rotative position, the locking side and the locking axle being cooperable for positioning the electronic device in the select rotative position, the locking disk being larger than the locking axle for securely attaching the mounting disk assembly to the cradle via the aperture, the front surface and recessed portion having differing elevations for supporting the electronic device above the mounting disk assembly, the base attachment surface attaching the mounting disk assembly to the select surface.

8. The support assembly of claim 7 wherein the cradle comprises at least one cupped prop for receiving the electronic device.

9. The support assembly of claim 7 wherein:
a. the aperture defines a channel, the channel separating the receiving side from the locking side;
b. the channel comprises first opposed parallel edges;
c. the locking axle comprises second opposed parallel edges;
d. the second opposed parallel edges are alignable with the first opposed parallel edges to allow the locking axle to slide through the channel from the receiving side to the locking side;
e. the cradle is rotatable to a non-aligning position relative to the first and second opposed parallel edges;
f. the second opposed parallel edges preventing the locking axle from entering the channel from the locking side when in the non-aligning position.

10. The support assembly of claim 9 wherein:
a. the cradle comprises a first recession and a second recession encircling the aperture;
b. the first recession comprises at least one locking tab;
c. the locking disk comprises at least one notch;
d. the at least one locking tab is alignable with at least one notch for securing the electronic device in the select rotative position.

11. A support assembly for supporting an electronic device, the support assembly comprising:
a. a device retention structure, the device retention structure for holding the electronic device; and
b. a mounting disk assembly, the mounting disk assembly being attachable to a select surface and comprising a locking axle, a locking disk, a base attachment structure, and a smaller disk, the locking disk being attached to the locking axle, the smaller disk being attached to the locking axle, the base attachment structure being attached to the smaller disk;

c. the mounting disk assembly being cooperable with the device retention structure for removably attaching said structure to the select surface;

d. the device retention structure comprising an assembly-receiving aperture, the assembly-receiving aperture comprising a receiving side and a locking side and being formed in a recessed portion of a front surface of the device retention structure, the receiving side for accepting the locking axle, the locking side for accepting the locking axle from the receiving side, the locking side and the locking axle being cooperable for positioning the device retention structure in a select position, the front surface and recessed portion extending in differing planes for supporting the device retention structure in adjacency to the mounting disk assembly;

e. the assembly-receiving aperture and the mounting disk assembly being cooperable for securely attaching the device retention structure to the select surface, the locking disk being larger than the locking axle for securely attaching the mounting disk assembly to the device retention structure via the assembly-receiving aperture, the base attachment surface for attaching the mounting disk assembly to the select surface.

12. The support assembly of claim 11 wherein:
a. the assembly-receiving aperture defines a channel, the channel separating the receiving side from the locking side;
b. the channel comprises first opposed parallel edges;
c. the locking axle comprises second opposed parallel edges;
d. the second opposed parallel edges are alignable with the first opposed parallel edges to allow the locking axle to slide through the channel from the receiving side to the locking side;
e. the device retention structure is rotatable to a non-aligning position;
f. the second opposed parallel edges is for preventing the locking axle from entering the channel from the locking side when in the non-aligning position.

13. The support assembly of claim 11 wherein:
a. the device retention structure comprises first and second recessions encircling the assembly-receiving aperture;
b. the first recession comprises at least one locking tab;
c. the locking disk comprises at least one notch; and
d. the at least one locking tab is alignable with at least one notch to secure the device retention structure in the select position.

14. The support assembly of claim 11 wherein the device retention structure comprises at least one cupped prop to removably retain the electronic device.

* * * * *